(12) United States Patent
Tanaka et al.

(10) Patent No.: US 7,856,702 B2
(45) Date of Patent: Dec. 28, 2010

(54) METHOD FOR MANUFACTURING AN ARMATURE FOR A DYNAMO-ELECTRIC MACHINE

(75) Inventors: Toshinori Tanaka, Tokyo (JP); Kyouhei Yamamoto, Tokyo (JP); Akihiro Daikoku, Tokyo (JP); Akihiko Imagi, Tokyo (JP); Yoshio Yoshikuwa, Tokyo (JP); Mitsuyuki Tsumura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 248 days.

(21) Appl. No.: 11/482,913

(22) Filed: Jul. 10, 2006

(65) Prior Publication Data

US 2006/0248707 A1   Nov. 9, 2006

Related U.S. Application Data

(60) Division of application No. 10/834,242, filed on Apr. 29, 2004, now Pat. No. 7,114,236, which is a division of application No. 09/987,374, filed on Nov. 14, 2001, now Pat. No. 6,844,649, which is a continuation of application No. 09/266,606, filed on Mar. 11, 1999, now abandoned.

(30) Foreign Application Priority Data

Aug. 10, 1998  (JP)  .................................. 10-226318

(51) Int. Cl.
*H01R 43/06* (2006.01)
(52) U.S. Cl. .............................. 29/597; 29/596; 29/598; 29/605; 310/179; 310/198
(58) Field of Classification Search ........... 29/596–598, 29/605, 606, 609; 242/433.3; 310/179, 198
See application file for complete search history.

(56) References Cited

U.S. PATENT DOCUMENTS

| 2,391,320 | A | * | 12/1945 | Lewis ......................... 318/245 |
| 2,632,125 | A | | 3/1953 | Baldwin |
| 3,458,793 | A | | 7/1969 | Tsergas |
| 4,467,234 | A | | 8/1984 | Tahara et al. |
| 4,520,287 | A | | 5/1985 | Wang et al. |
| 4,532,449 | A | | 7/1985 | Aoki |
| 4,635,349 | A | | 1/1987 | Rabe |
| 6,079,659 | A | | 6/2000 | Yamamura et al. |

FOREIGN PATENT DOCUMENTS

| DE | 24 51 255 A1 | 5/1976 |
| DE | 198 51 272 A1 | 5/1999 |
| JP | 07147755 A | 6/1995 |
| JP | 10-295062 A | 11/1998 |
| JP | 11-164533 A | 6/1999 |

OTHER PUBLICATIONS

Sequenz, H.: Die Wicklungen elektrischer Maschinen "The Wingdings of Electric Machines," vol. 2, Vienna, Springer-Verlag, 1952, pp. 46 et seq. and pp. 128 to 131.

* cited by examiner

*Primary Examiner*—Thiem Phan
(74) *Attorney, Agent, or Firm*—Sughrue Mion, PLLC

(57) ABSTRACT

A method for manufacturing an armature including securing a core to the shaft having a plurality of slots extending in the axial direction formed on the outer circumferential surface thereof, forming a coil composed of a plurality of coil portions by simultaneously winding wires a plurality of turns around a pair of slots separated by a predetermined number of slots and offsetting each of the coil portions one slot at a time in the circumferential direction of the core, securing a commutator to the shaft having a plurality of segments, adjacent coil portions having a slot along one side thereof, wherein a number of vacant slots between adjacent ones of the coil portions within each of simultaneously-wound coil portion groups is nonuniform, and electronically connecting segments which should have the same electric potential by means of equalizing connectors so that each of pairs of the coil portions that should have the same electric potential has a substantially equal electric potential.

1 Claim, 17 Drawing Sheets

METHOD FOR MANUFACTURING AN ARMATURE FOR A DYNAMO-ELECTRIC MACHINE

This is a divisional of application Ser. No. 10/834,242 filed Apr. 29, 2004 U.S. Pat. No. 7,114,236, which is a divisional of application Ser. No. 09/987,374 filed Nov. 14, 2001 U.S. Pat. No. 6,844,649, which is a continuation of application Ser. No. 09/266,606 filed Mar. 11, 1999 (abandoned), the disclosures of which are incorporated herein by reference.

BACKGROUND OF THE INVENTION

1. Field of the Invention

The present invention relates to an armature for a dynamo-electric machine in which side portions of adjacent coil portions, etc., share a slot.

2. Description of the Related Art

FIG. 11 is a side elevation of an armature 1 for a conventional motor. The armature 1 is disposed so as to be freely rotatable within a stator (not shown) having four poles. The armature 1 comprises: a motor shaft 2; a core 3 secured to the motor shaft 2 having slots 4 extending in the axial direction; a coil 6 composed of wires 5 coated with enamel wound around the core 3; and a commutator 8 secured to the motor shaft 2 at one end of the core 3.

The commutator 8 has twenty-one segments 11; insulating segments 10 electrically insulating the segments 11 from each other; and hooks 12 disposed so as to protrude from each of the segments 11 which are electrically connected to the wires 5.

FIG. 12 is a front elevation of the core 3. Twenty-one slots 4 are formed in the core 3 spaced equidistantly in the circumferential direction and teeth 9 are disposed between the slots 4. The coil 6 is composed of wires 5 wound onto the core by so-called "lap winding".

FIGS. 13 to 15 are diagrams explaining the winding of the wires 5 onto the core 3 by the lap winding method.

FIG. 13 is a diagram showing the wires 5 being simultaneously supplied from the nozzles of a winding device (not shown) which winds the wires 5 onto the core 3, simultaneously forming a first coil portion A 30, a first coil portion B 31, and a first coil portion C 32, respectively. The first coil portion A 30 is formed by winding a wire 5 supplied from a first nozzle, for example, ten or so turns around tooth No. 2 of the teeth 9 and tooth No. 6 of the teeth 9 which are separated by four slots 4. The first coil portion B 31 is formed by winding a wire 5 supplied from a second nozzle, for example, ten or so turns around tooth No. 9 of the teeth 9 and tooth No. 13 of the teeth 9 which are separated by four slots 4. The first coil portion C 32 is formed by winding a wire 5 supplied from a third nozzle, for example, ten or so turns around tooth No. 16 of the teeth 9 and tooth No. 20 of the teeth 9 which are separated by four slots 4.

FIG. 14 is a diagram showing wires 5 continuing to be supplied from the nozzles of the winding device (not shown) after engaging the hooks 12, additionally forming a second coil portion A 36, a second coil portion B 37, and a second coil portion C 38, respectively.

FIG. 15 is a diagram showing the completed winding of the wires 5 between the teeth 9 of the core 3. A third coil portion A 42, a fourth coil portion A 45, a fifth coil portion A 48, a sixth coil portion A 51, and a seventh coil portion A 54 are additionally and continuously formed by the wire 5 supplied from the first nozzle. A third coil portion B 43, a fourth coil portion B 46, a fifth coil portion B 49, a sixth coil portion B 52, and a seventh coil portion B 55 are additionally and continuously formed by the wire 5 supplied from the second nozzle.

In the above motor, the armature 1 is rotated about the motor shaft 2 by electromagnetic action by supplying an electric current to the coil 6 from outside by means of brushes (not shown) which contact the segments 11. The segments 11 contacted by the brushes are switched in succession, switching the direction of the current supplied to the coil 6, so that whatever rotational position the armature 1 is in, the rotating force on the armature 1 is in a specific direction.

In the conventional (but not prior art) armature 1 described above, there are twenty-one slots 4 in total and three nozzles, the total number of slots 4 being evenly divisible by the number of nozzles, and the wires 5 are wound uniformly in each of the coil portions, making the impedance substantially the same in adjacent coils portions.

However, if, for example, the number of slots is increased from twenty-one to twenty-two in order to increase torque, and four nozzles are used to wind the wires onto such a core, as shown in FIG. 17, adjacent coil portions must share a slot along one side.

FIG. 17 is a diagram showing wires being simultaneously supplied to the core from four nozzles of a winding device (not shown) having two rotational angles, 98.2 degrees and 81.8 degrees, as shown in FIG. 16, simultaneously forming a first coil portion A 108, a first coil portion B 109, a first coil portion C 110, and a first coil portion D 111, respectively.

The first coil portion A 108 in FIG. 17 is formed by winding a wire supplied from a first nozzle, for example, ten or so turns around tooth No. 4 of the teeth 107 and tooth No. 22 of the teeth 107 which are separated by four slots 102. The first coil portion B 109 is formed by winding a wire supplied from a second nozzle, for example, ten or so turns around tooth No. 5 of the teeth 107 and tooth No. 9 of the teeth 107 which are separated by four slots 102. The first coil portion C 110 is formed by winding a wire supplied from a third nozzle, for example, ten or so turns around tooth No. 11 of the teeth 107 and tooth No. 15 of the teeth 107 which are separated by four slots 102. The first coil portion D 111 is formed by winding a wire supplied from a fourth nozzle, for example, ten or so turns around tooth No. 16 of the teeth 107 and tooth No. 20 of the teeth 107 which are separated by four slots 102.

In this case, the slot 102 between tooth No. 4 of the teeth 107 and tooth No. 5 of the teeth 107 is shared by a side portion of the first coil portion A 108 and a side portion of the first coil portion B 109, and the slot 102 between tooth No. 15 of the teeth 107 and tooth No. 16 of the teeth 107 is shared by a side portion of the first coil portion C 110 and a side portion of the first coil portion D 111.

For that reason, differences in impedance arise between the coil portions 108 to 111 in the slots 102 shared by the coil portions 108 to 111 because the wires are wound under conditions in which the coil portions 108 to 111 interfere with each other, leading to the following problems:

Differences in induced voltage arise in the coil portions 108 to 111 and unbalanced currents flow through the brushes, and as a result, the rectifying action of the brushes deteriorates, the temperature in the brushes and the commutator increases together with the increase in sparks generated by the brushes, the life of the brushes and the commutator is reduced, torque ripples increase, and the operating noise of the motor increases markedly due to the combined effects of the above.

SUMMARY OF THE INVENTION

The present invention aims to solve the above problems and an object of the present invention is to provide an armature for a dynamo-electric machine capable of preventing the occurrence of unbalanced currents flowing through the brushes and of reducing operating noise while maintaining the rectifying effect of the brushes, and to provide a method of manufacture therefor.

To this end, according to the present invention, there is provided an armature for a dynamo-electric machine comprising: a shaft; a core secured to the shaft having a plurality of slots extending in the axial direction formed on the outer circumferential surface thereof; a coil composed of a plurality of coil portions formed by winding wires a plurality of turns around a pair of the slots separated by a predetermined number of the slots and offsetting each of the coil portions one slot at a time in the circumferential direction of the core; and a commutator secured to the shaft having a plurality of segments; adjacent the coil portions sharing one of the slots along one side thereof, wherein the segments which should have the same electric potential are electrically connected by means of equalizing connectors.

According to another aspect of the present invention, there is provided an armature for a dynamo-electric machine comprising: a shaft; a core secured to the shaft having a plurality of slots extending in the axial direction formed on the outer circumferential surface thereof; a coil composed of a plurality of coil portions formed by winding wires a plurality of turns around a pair of the slots separated by a predetermined number of the slots and offsetting each of the coil portions one slot at a time in the circumferential direction of the core; and a commutator secured to the shaft having a plurality of segments; the number of vacant slots between adjacent the coil portions being nonuniform, wherein the segments which should have the same electric potential are electrically connected by means of equalizing connectors.

According to another aspect of the present invention, there is provided an armature for a dynamo-electric machine comprising: a shaft; a core secured to the shaft having a plurality of slots extending in the axial direction formed on the outer circumferential surface thereof; a coil composed of a plurality of coil portions formed by winding wires a plurality of turns around a pair of the slots separated by a predetermined number of the slots and offsetting each of the coil portions one slot at a time in the circumferential direction of the core for a plurality of laps; and a commutator secured to the shaft having a plurality of segments; the number of turns of the wires in the coil portions differing in the initial lap and the subsequent laps, wherein the segments which should have the same electric potential are electrically connected by means of equalizing connectors.

DETAILED DESCRIPTION OF THE PREFERRED EMBODIMENTS

Embodiment 1

Figure 1:
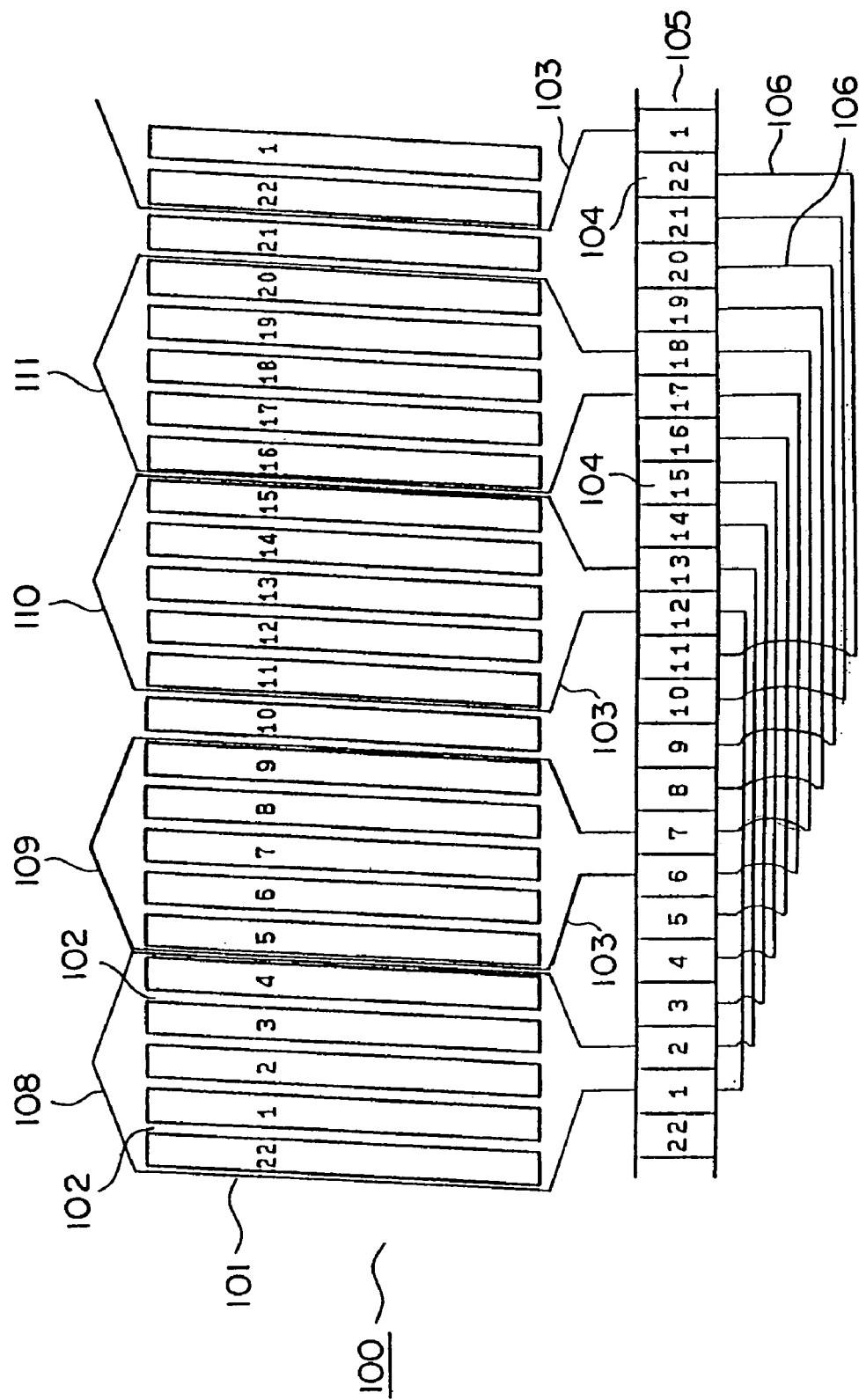
FIG. 1 is a winding diagram for an armature according to Embodiment 1 of the present invention.

FIG. 1 is a winding diagram for an armature 100 of a motor which is a dynamo-electric machine according to Embodiment 1 of the present invention and shows the winding of wires 103 onto a core 101 having four poles and twenty-two slots 102 using four nozzles of a winding device (not shown) simultaneously. The diagram shows the enamel-coated wires 103 being wound by lap winding across a plurality of slots 102, simultaneously forming a first coil portion A 108, a first coil portion B 109, a first coil portion C 110, and a first coil portion D 111, respectively. A commutator 105 has twenty-two segments 104, segments 104 which should have the same electric potential being electrically connected by means of equalizing connectors 106. For example, the first segment 104 is connected to the twelfth segment 104, the second segment 104 is connected thirteenth segment 104, etc.

Figure 2:
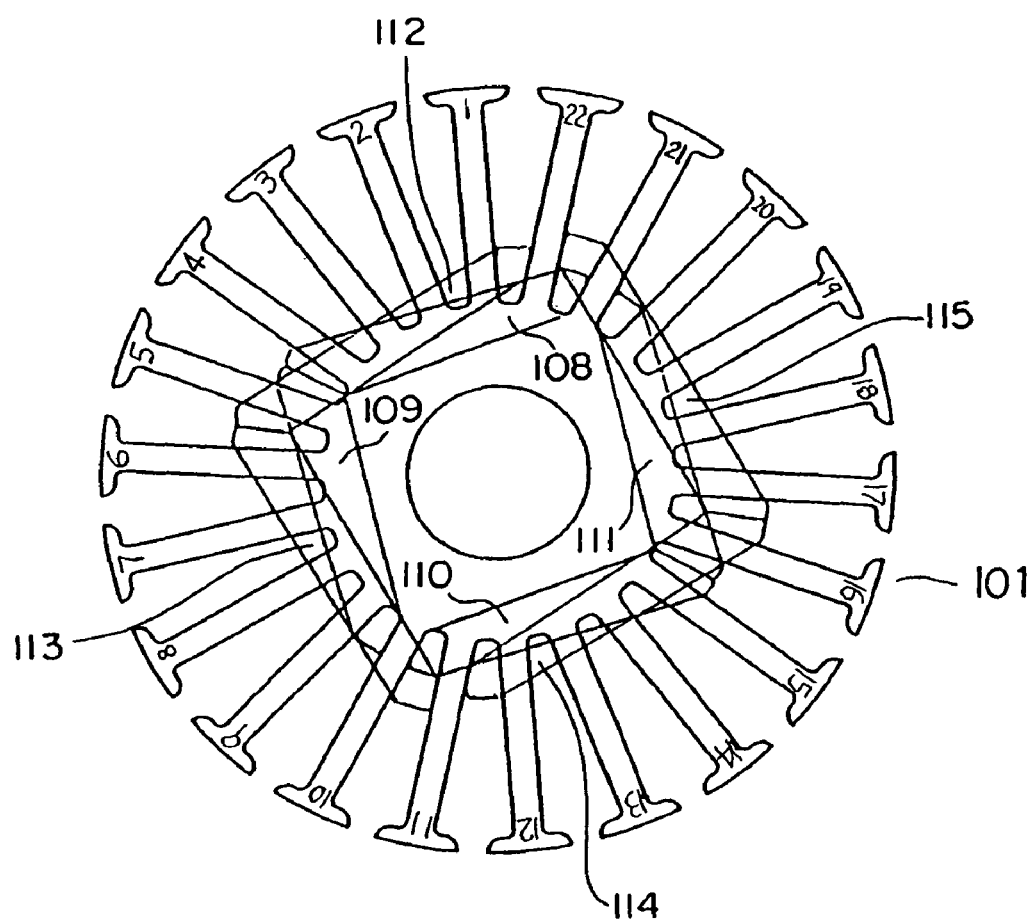
FIG. 2 is a diagram showing coil portions wound on a core during the winding of wires by lap winding.
Figure 17:
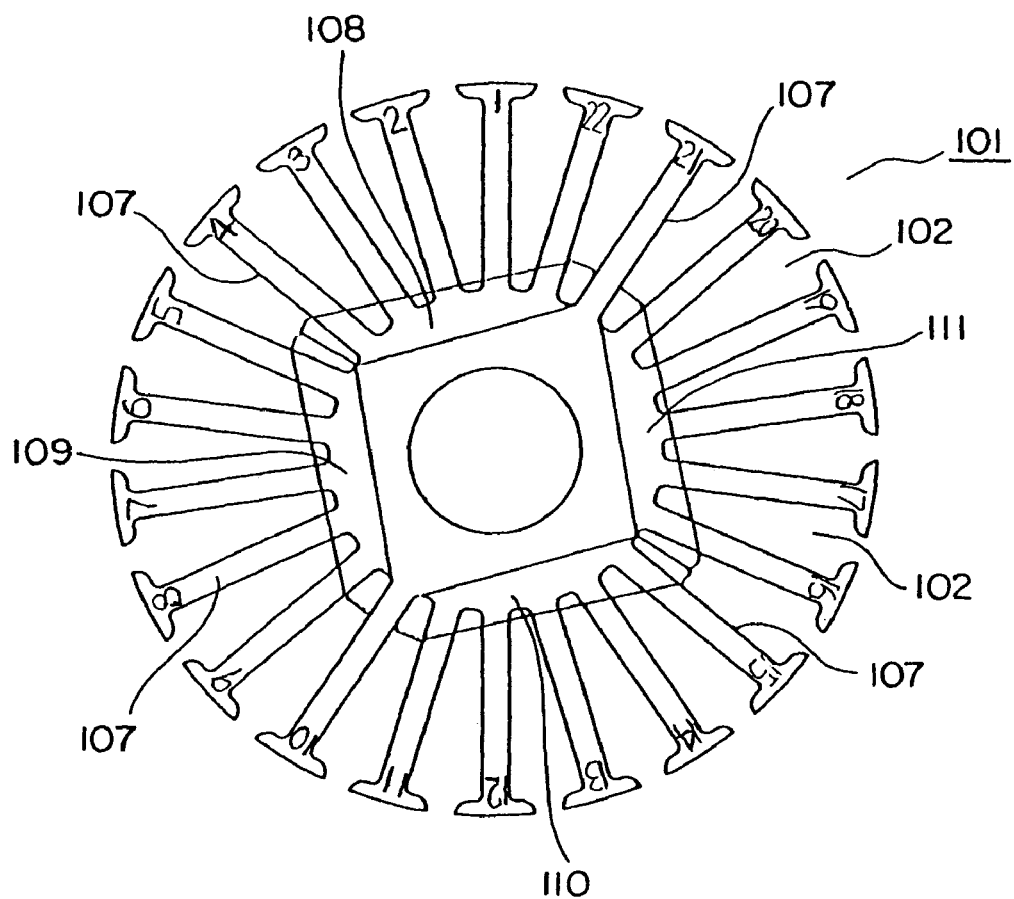
FIG. 17 is a diagram showing wires being wound by lap winding onto the core in FIG. 16.

FIG. 2 is a diagram showing wires 103 being supplied from each of the nozzles of the winding device and wound onto the core 101 and shows the formation of a second coil portion A 112, a second coil portion B 113, a second coil portion C 114, and a second coil portion D 115, respectively, after the engagement of hooks on the segments 104. Moreover, the initial formation of coil portions 108 to 111 on the core 101 by wires 103 supplied from each of the nozzles is the same as in FIG. 17.

Figure 3:
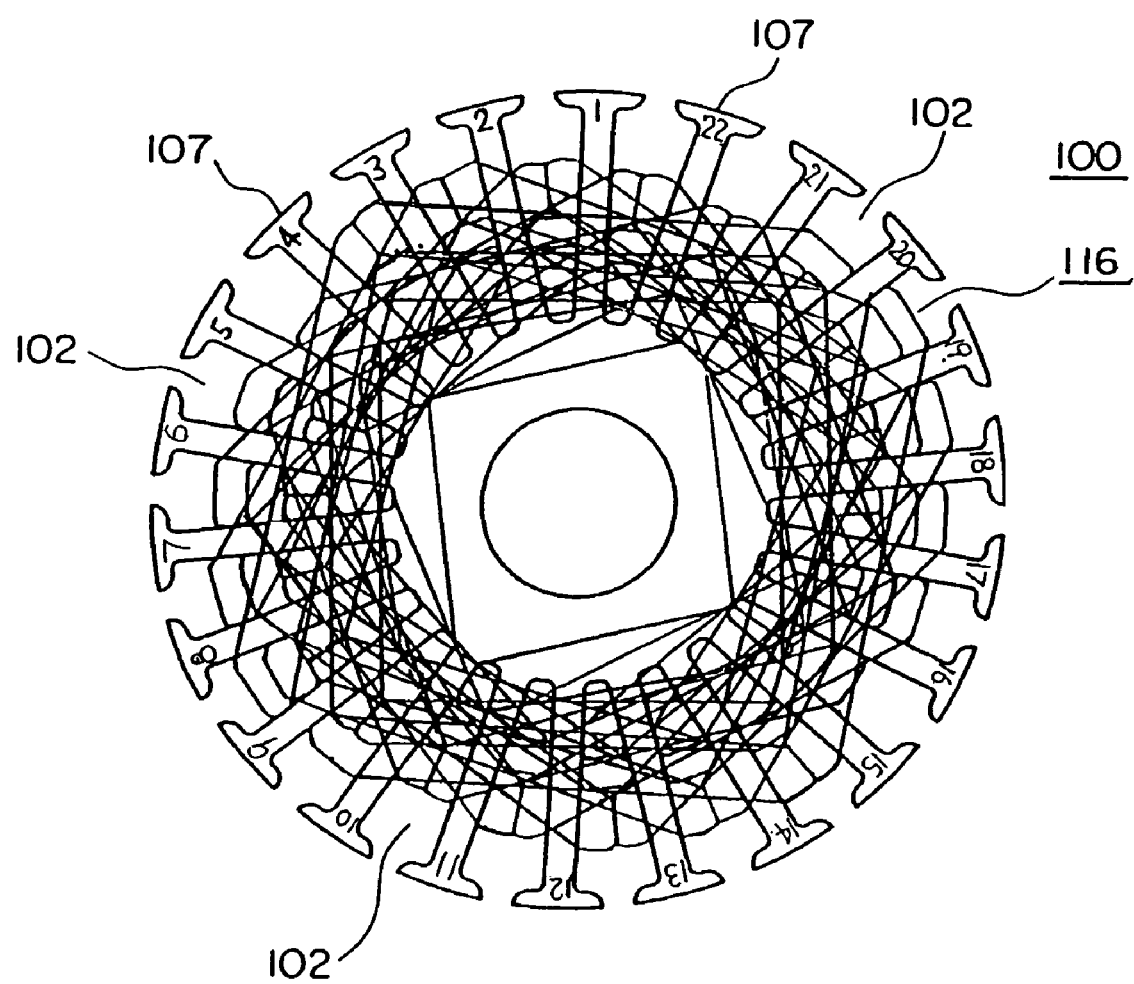
FIG. 3 is a diagram showing a coil wound on a core upon completion of the winding of wires by lap winding.

FIG. 3 is a front elevation of the armature 100 with a coil 116 completely formed thereon by continuing to wind the wires 103 while offsetting one slot at a time.

In the armature 100 having the above construction, since segments 104 which should have the same electric potential are electrically connected by means of the equalizing connectors 106, although the wires are wound with the side portions of adjacent coil portions 108 to 115 sharing slots 102 and the coil portions 108 to 115 interfering with each other, unbalanced currents do not flow through the brushes due to differences in induced voltage arising in the coil portions. As a result, inconveniences such as the rectifying action of the brushes deteriorating, the temperature in the brushes and the commutator increasing together with increases in sparks generated by the brushes, the life of the brushes and the commutator being reduced, torque ripples increasing, or the operating noise of the motor increasing markedly due to the combined effects of the above, do not occur.

Embodiment 2

Figure 4:
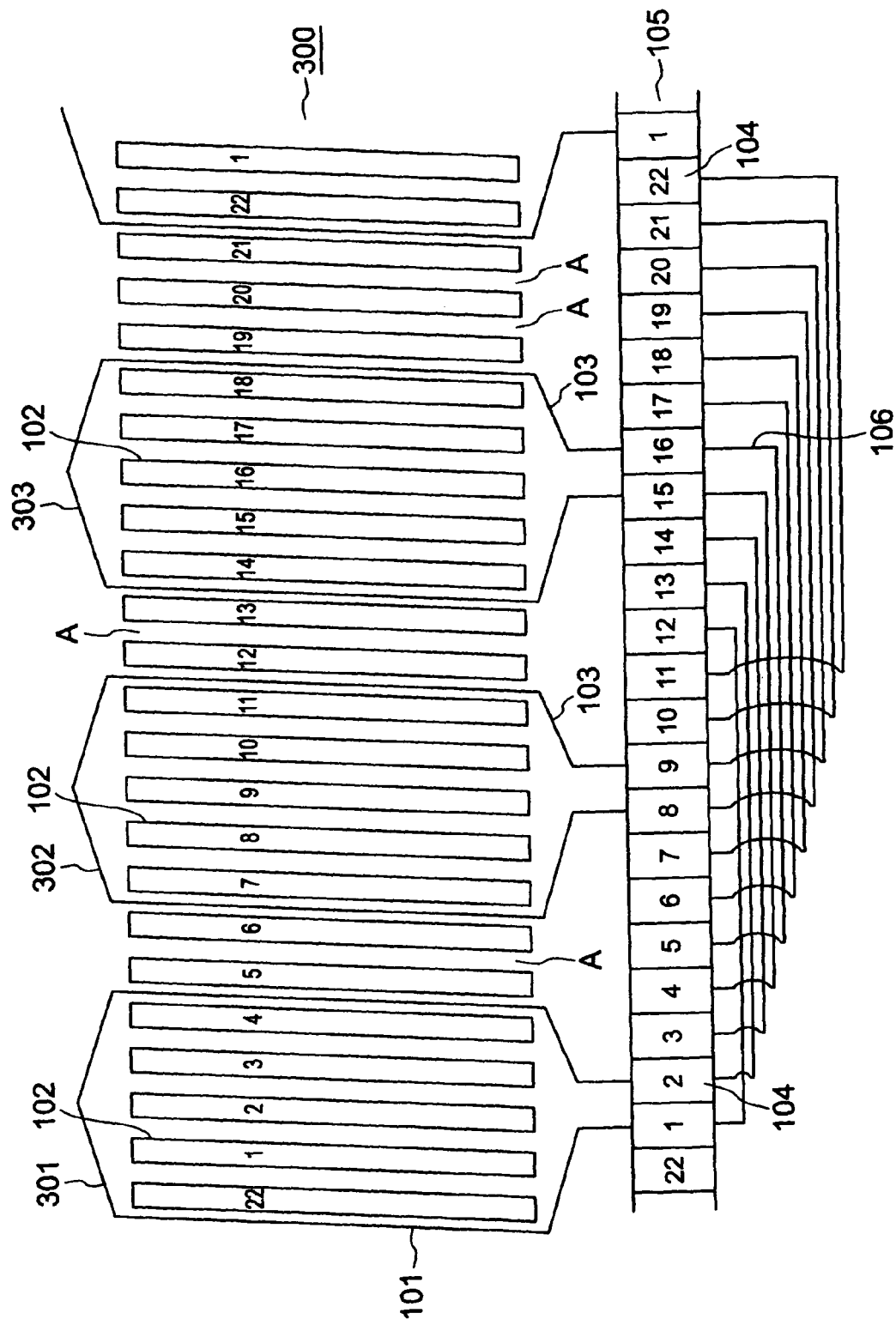
FIG. 4 is a winding diagram for an armature according to Embodiment 2 of the present invention.

FIG. 4 is a winding diagram for an armature 300 of a motor according to Embodiment 2 of the present invention and shows the winding of wires 103 onto a core 101 having twenty-two slots 102 using three nozzles of a winding device (not shown) simultaneously. In this embodiment, wires 103 are simultaneously supplied and wound onto the core 101 from a plurality of nozzles of a winding machine whose number does not evenly divide the number of slots 102, giving rise to vacant slots A between adjacent coil portions 301, 302, 303. The number of vacant slots may be one or two and their distribution is nonuniform. In this case, the wires 103 are not wound uniformly onto the core 101 and there is a risk that differences in induced voltages may occur between the coil portions 301, 302, 303. However, in this case also, the flowing of unbalanced currents through the brushes is prevented by electrically connecting segments which should have the same electric potential by means of equalizing connectors.

Embodiment 3

Figure 5:
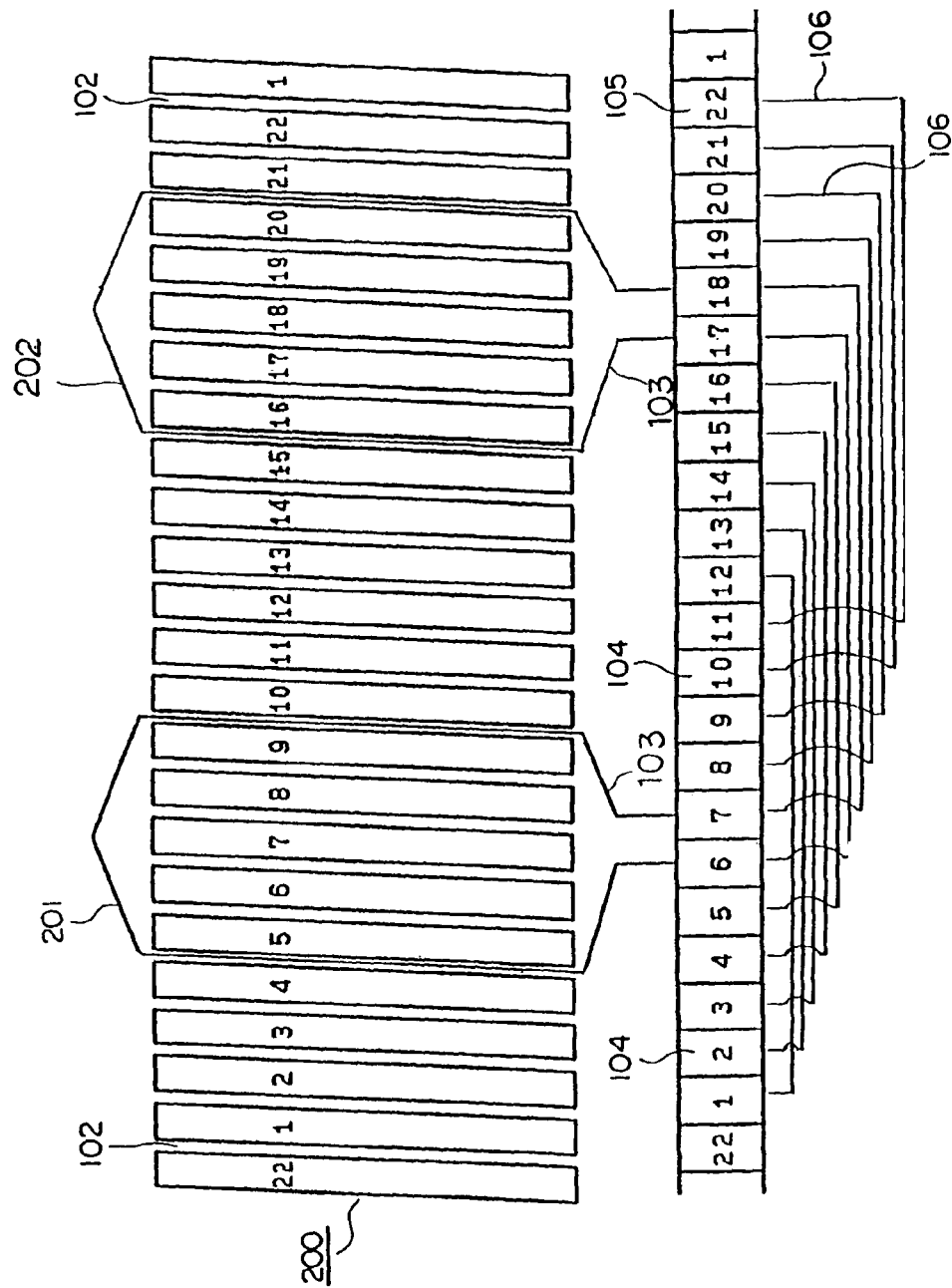
FIG. 5 is a winding diagram for an armature according to Embodiment 3 of the present invention.
Figure 6:
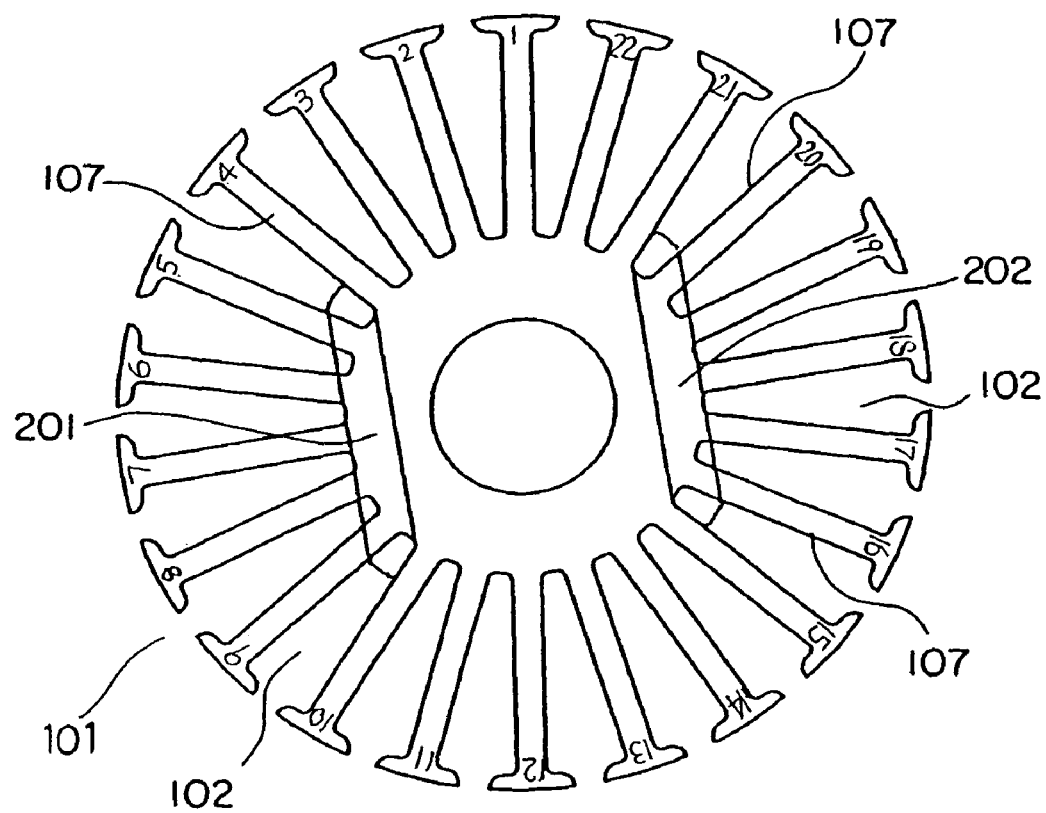
FIG. 6 is a diagram showing wires being wound by lap winding onto the core in FIG. 5.

FIG. 5 is a winding diagram for an armature 200 of a motor according to Embodiment 3 of the present invention and shows wires 103 being simultaneously supplied from two nozzles of a winding device (not shown), simultaneously forming a first coil portion A 201 and a first coil portion B 202, respectively. Segments 104 which should have the same electric potential are electrically connected by means of equalizing connectors 106. For example, the first segment 104 is connected to the twelfth segment 104, the second segment 104 is connected thirteenth segment 104, etc. FIG. 6 is a front elevation of the core 101 at that time.

Figure 7:
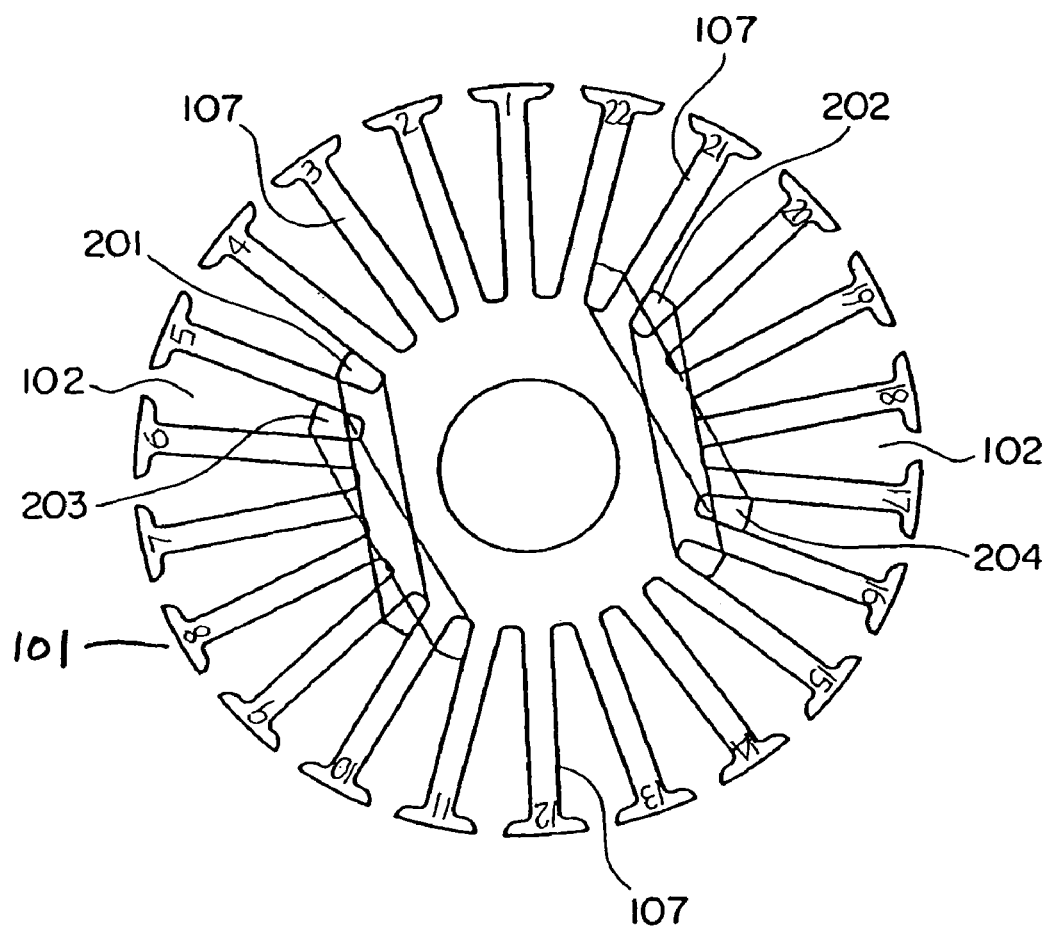
FIG. 7 is a diagram showing wires being wound by lap winding onto the core in FIG. 5.

FIG. 7 is a diagram showing wires 103 continuing to be supplied from the two nozzles and shows the additional formation of a second coil portion A 203 and a second coil portion B 204, respectively, after the engagement of hooks on the segments 104.

Figure 8:
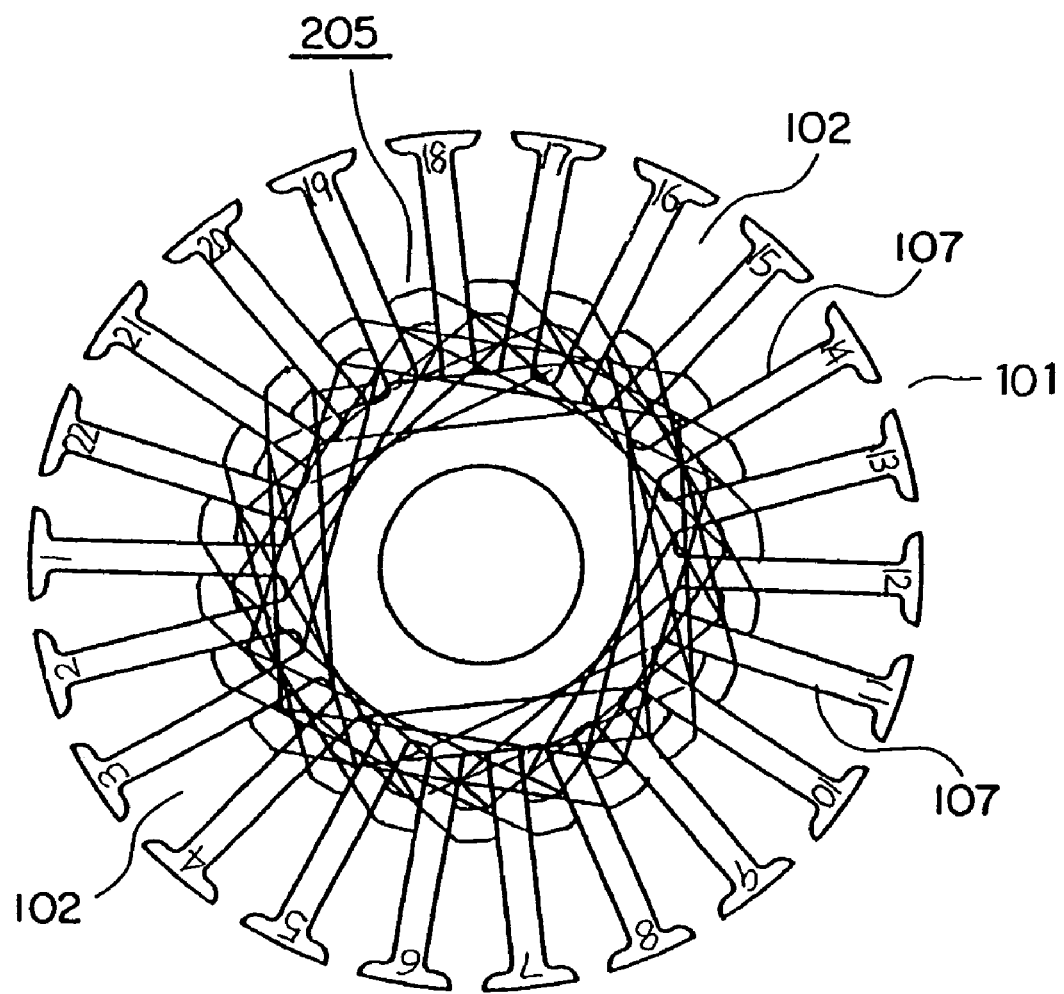
FIG. 8 is a diagram showing a coil body wound on the core in FIG. 5 during the winding of wires by lap winding.
Figure 9:
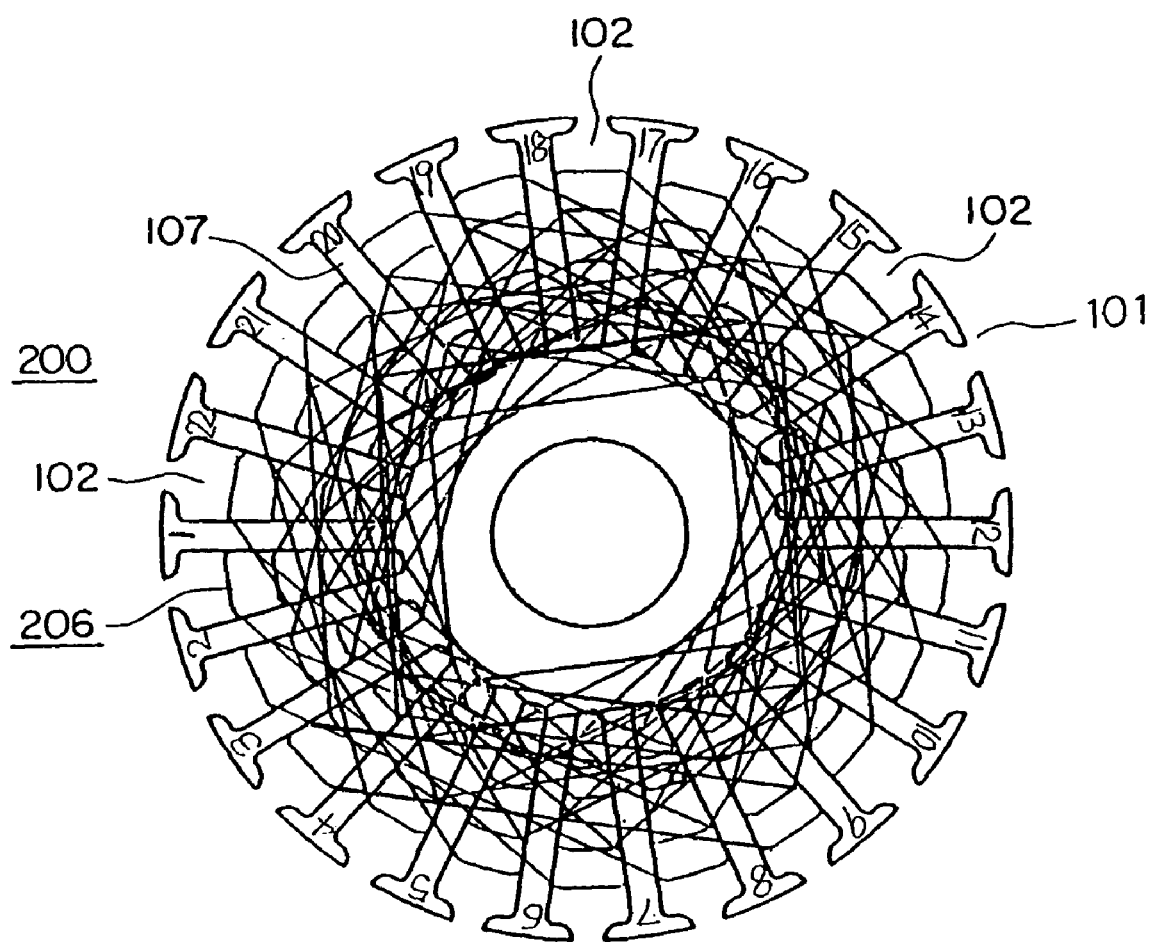
FIG. 9 is a diagram showing a coil wound on the core in FIG. 5 upon completion of the winding of wires by lap winding.

FIG. 8 is a front elevation of the core 101 with a coil body 205 formed thereon by continuing to wind the wires 103 for a total of eleven slots while offsetting one slot at a time. FIG. 9 shows the formation of a coil 206 upon completion of a winding in which the wires 103 in the core portion up to the point in FIG. 8 were wound, for example, six turns, and after that were wound, for example, seven turns.

By making six turns of the wires 103 in the initial lap and seven in the subsequent laps in this manner, the wires 103 have the equivalent of 6.5 turns, facilitating the modification of motor performance and increasing the degree of design freedom. There is a risk that in this condition differences in impedance between the coil portions may arise due to the differences in the number of turns of the wires 103, and unbalanced currents may flow through the brushes due to differences in induced voltage arising in the coil portions. However, in this embodiment, as with Embodiments 1 and 2, since segments 104 which should have the same electric potential are electrically connected by means of the equalizing connectors 106, unbalanced currents do not flow through the brushes.

Embodiment 4

Figure 10:
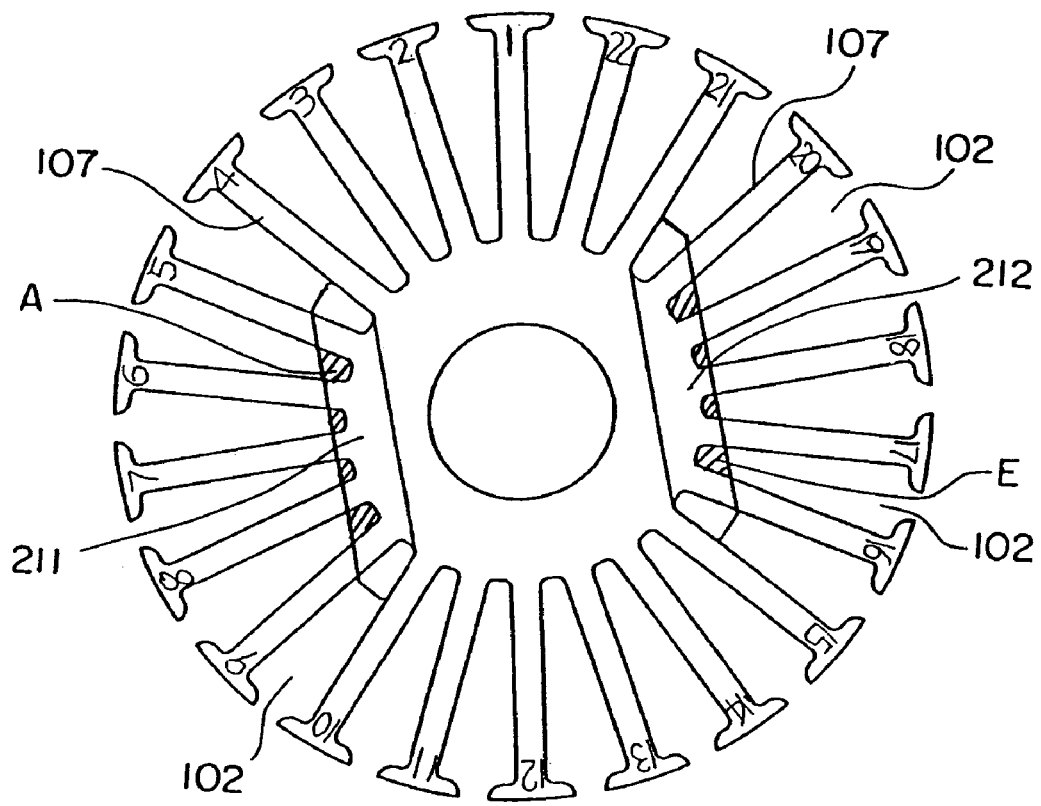
FIG. 10 is a diagram showing coil portions wound on the core of an armature according to Embodiment 4 of the present invention during the winding of wires by lap winding.
Figure 11:
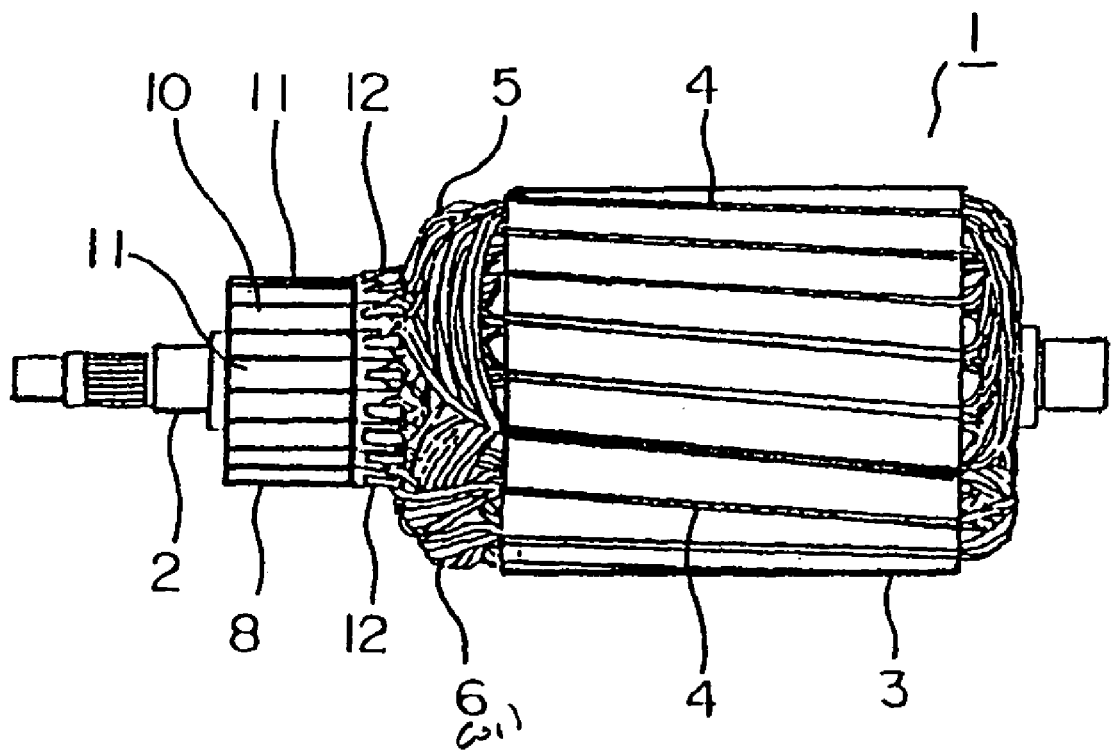
FIG. 11 is a side elevation of a conventional (but not prior art) armature.
Figure 12:
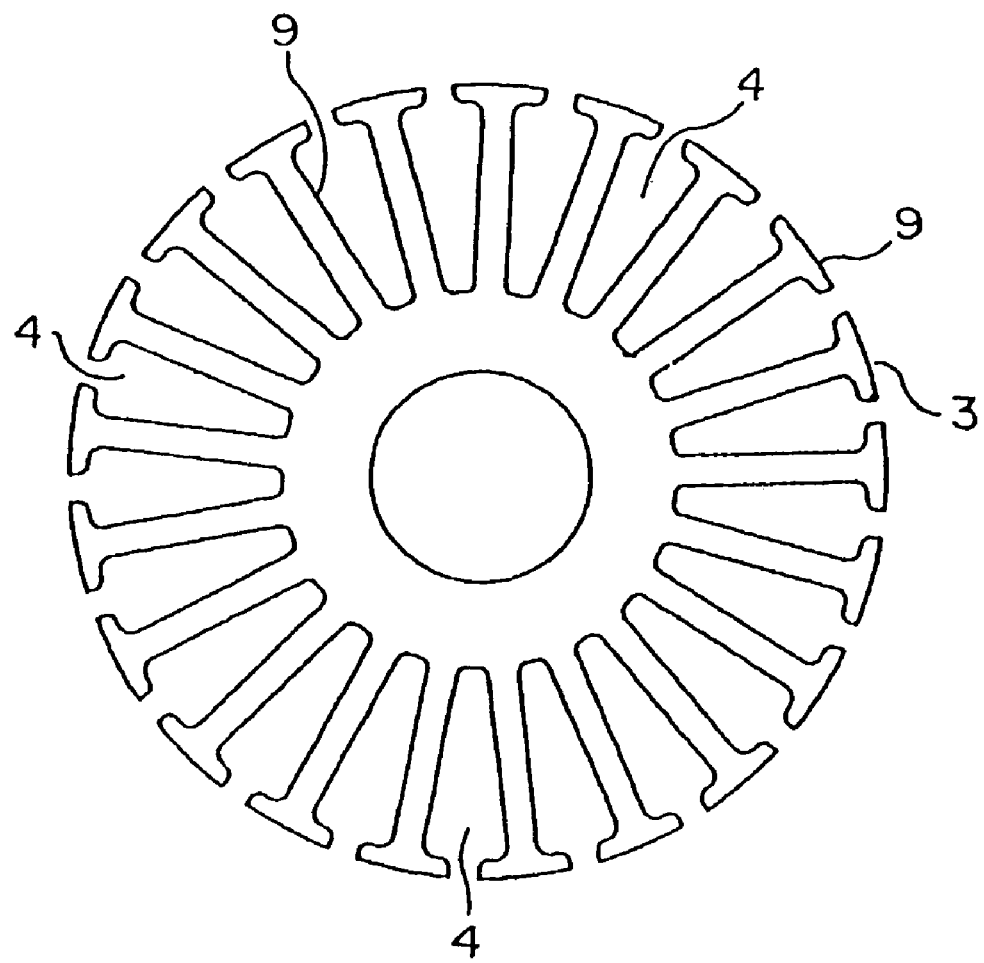
FIG. 12 is a front elevation of the core in FIG. 11.
Figure 13:
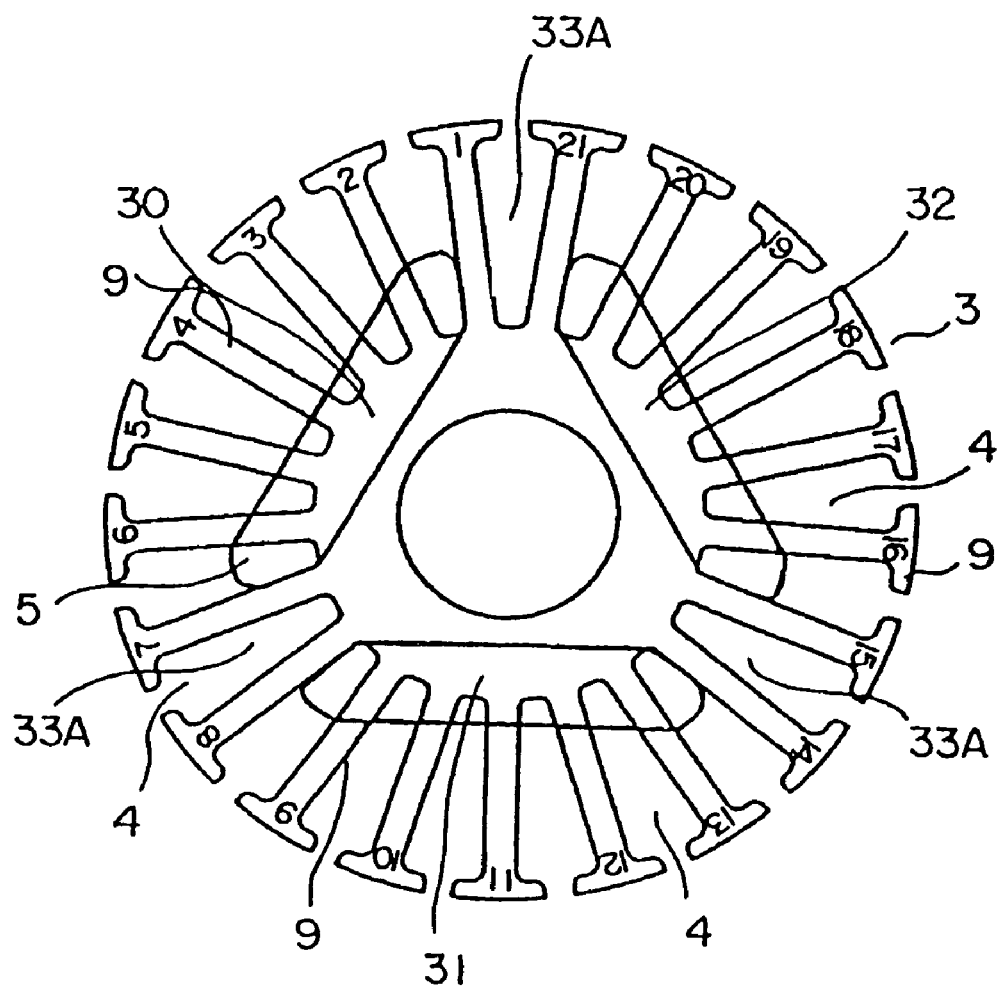
FIG. 13 is a diagram showing coil portions wound on the core in FIG. 12 during the winding of wires by lap winding.
Figure 14:
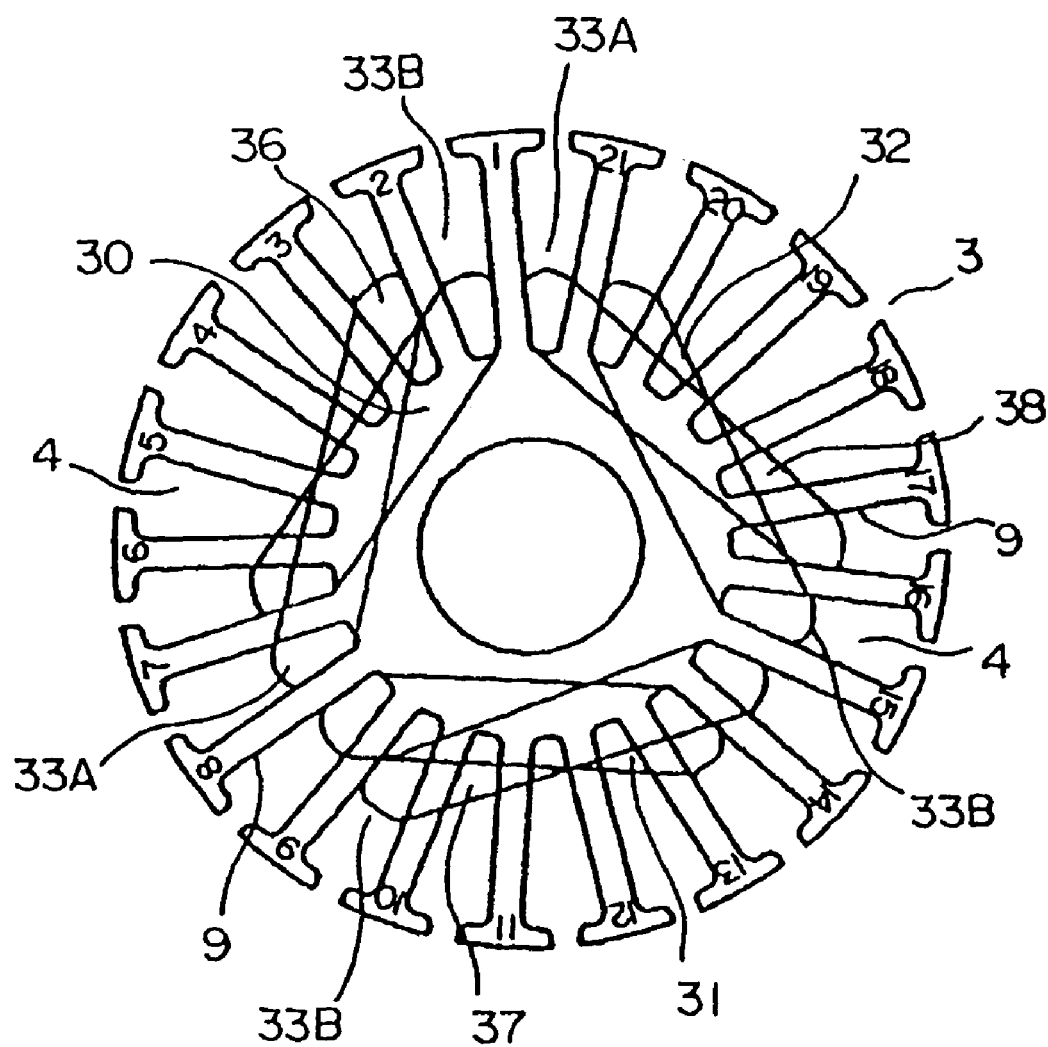
FIG. 14 is a diagram showing coil portions wound on the core in FIG. 12 during the winding of wires by lap winding.
Figure 15:
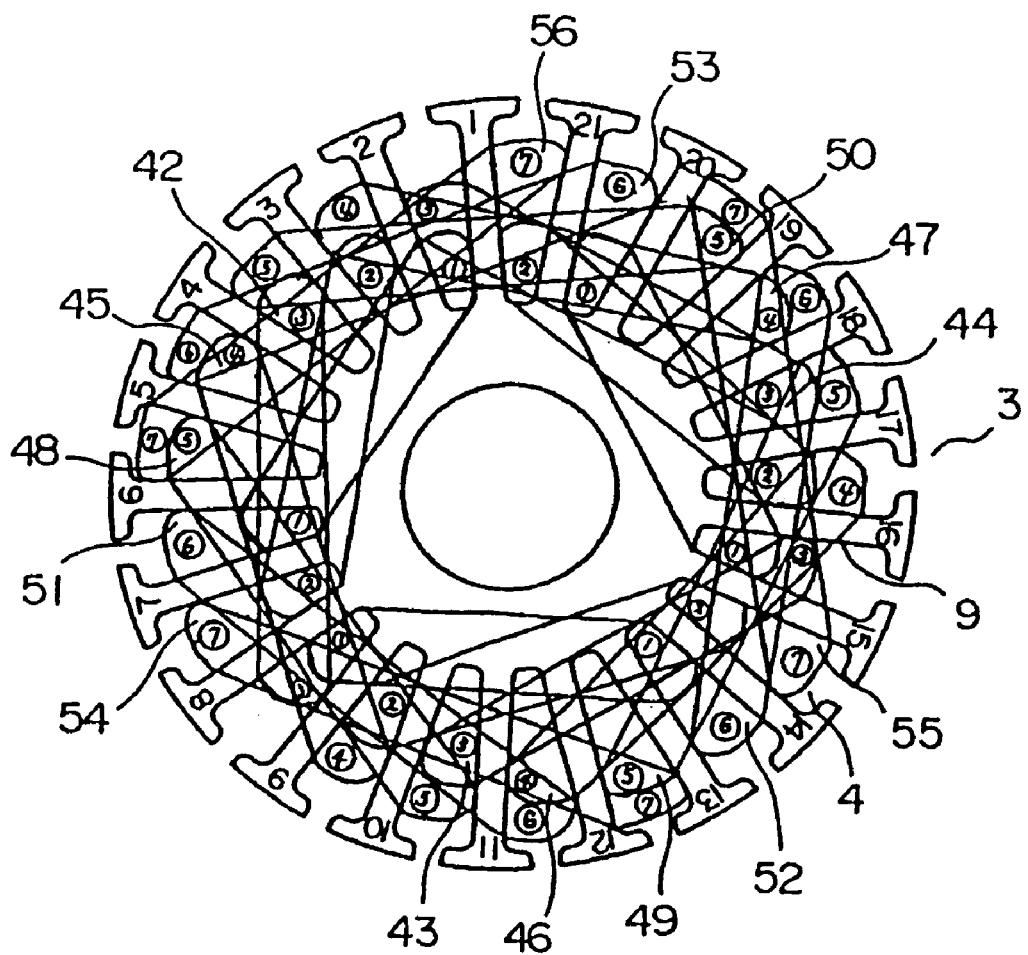
FIG. 15 is a diagram showing a coil wound on the core in FIG. 12 upon completion of the winding of wires by lap winding.
Figure 16:
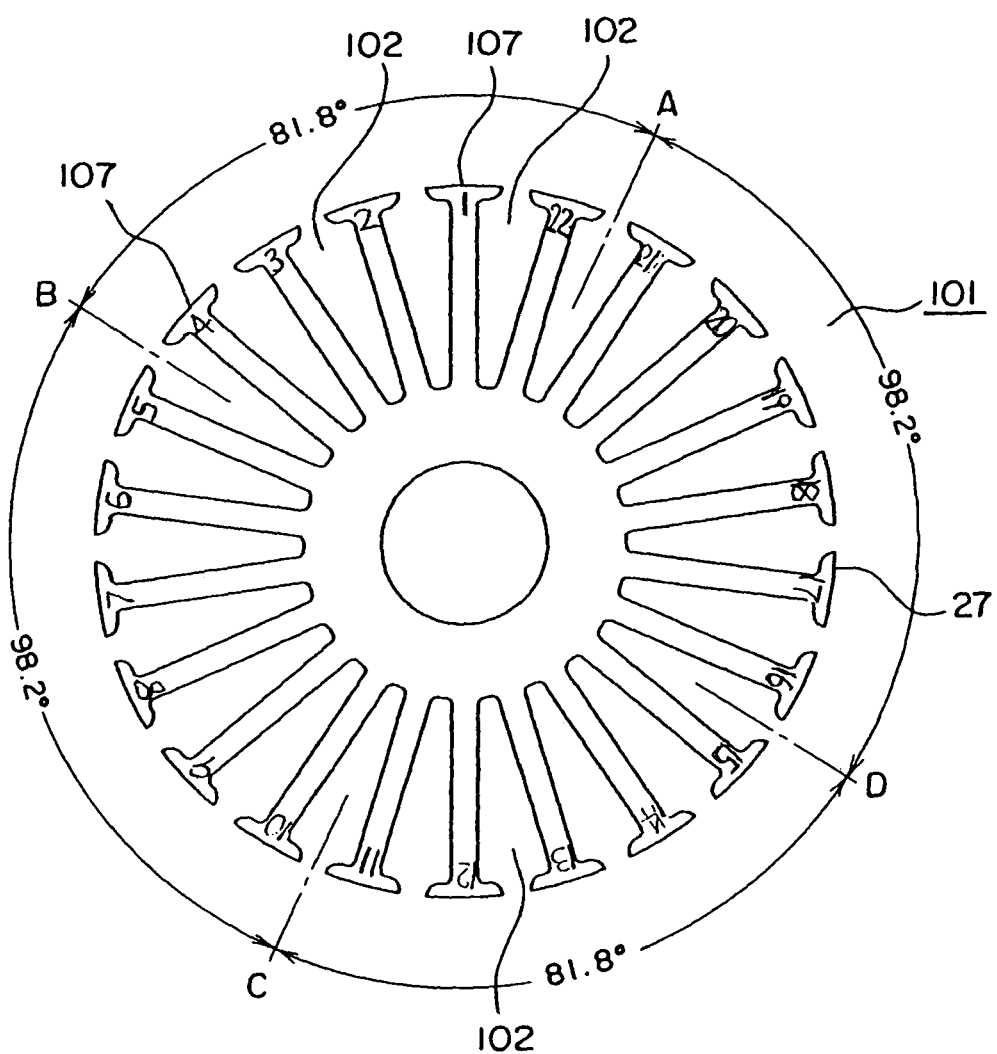
FIG. 16 is a front elevation showing another example of a core.

FIG. 10 is a diagram showing a case in which the wires 103 are wound seven turns in the initial lap. In this case the shaded portions E of the slots 102 are completely covered by a first coil portion A 211 and a first coil portion B 212, and the area of the shaded portions E is greater than in Embodiment 3 (see FIG. 6). As a result, the cross-sectional area of the slots 102 is reduced and windability is less favorable than in Embodiment 3, but by winding more turns in the initial lap when the diameter of the coil portions is small and winding less turns in the subsequent laps when the diameter of the coil portions is large, the difference in impedance between the initial lap and the subsequent laps is reduced.

Each of the above embodiments of the present invention has been explained using a motor as an example of a dynamo-electric machine, but the present invention can also be applied to a generator. Furthermore, the number of equalizing connectors 106 in each of the embodiments is eleven, but of course they are not limited to this number.

As explained above, the armature for a dynamo-electric machine according to one aspect of the present invention comprises: a shaft; a core secured to the shaft having a plurality of slots extending in the axial direction formed on the outer circumferential surface thereof; a coil composed of a plurality of coil portions formed by winding wires a plurality of turns around a pair of the slots separated by a predetermined number of the slots and offsetting each of the coil portions one slot at a time in the circumferential direction of the core; and a commutator secured to the shaft having a plurality of segments; adjacent the coil portions sharing one of the slots along one side thereof, wherein the segments which should have the same electric potential are electrically connected by means of equalizing connectors. Therefore, operating noise can be reduced while maintaining the performance of the dynamo-electric machine and the rectifying effect of the brushes.

According to another aspect of the present invention, the armature for a dynamo-electric machine comprises: a shaft; a core secured to the shaft having a plurality of slots extending in the axial direction formed on the outer circumferential surface thereof; a coil composed of a plurality of coil portions formed by winding wires a plurality of turns around a pair of slots separated by a predetermined number of the slots and offsetting each of the coil portions one slot at a time in the circumferential direction of the core; and a commutator secured to the shaft having a plurality of segments; the number of vacant slots between adjacent the coil portions being nonuniform, wherein the segments which should have the same electric potential are electrically connected by means of equalizing connectors. Therefore, operating noise can be reduced while maintaining the performance of the dynamo-electric machine and the rectifying effect of the brushes.

According to still another aspect of the present invention, the armature for a dynamo-electric machine comprises: a shaft; a core secured to the shaft having a plurality of slots extending in the axial direction formed on the outer circumferential surface thereof; a coil composed of a plurality of coil portions formed by winding wires a plurality of turns around a pair of the slots separated by a predetermined number of the slots and offsetting each of the coil portions one slot at a time in the circumferential direction of the core for a plurality of laps; and a commutator secured to the shaft having a plurality of segments; the number of turns of the wires in the coil portions differing in the initial lap and the subsequent laps, wherein the segments which should have the same electric potential are electrically connected by means of equalizing connectors. Therefore, operating noise can be reduced while maintaining the performance of the dynamo-electric machine and the rectifying effect of the brushes.

According to one form of the armature for a dynamo-electric machine, the number of turns of the wires in the coil portions in the initial lap may be less than the number of turns of the wires in the coil portions in the subsequent laps. Therefore, the modification of torque and revolution performance can be facilitated and the degree of design freedom of the dynamo-electric machine increased, while maintaining the rectifying effect of the brushes and with the operating noise reduced, even when the number of turns of the wires in the coil portions in the initial lap is less than the number of turns of the wires in the coil portions in the subsequent laps.

According to another form of the armature for a dynamo-electric machine, the number of turns of the wires in the coil portions in the initial lap may be greater than the number of turns of the wires in the coil portions in the subsequent laps. Therefore, differences in impedance between the coil portions in the initial lap and the coil portions in the subsequent laps are small even when the number of turns of the wires in the coil portions in the initial lap is greater than the number of turns of the wires in the coil portions in the subsequent laps, enabling operating noise to be reduced while maintaining the performance of the dynamo-electric machine and the rectifying effect of the brushes.

What is claimed is:

1. A method for manufacturing an armature for a dynamo-electric machine comprising:
   securing a core to a shaft, wherein said core has a plurality of slots extending in an axial direction formed on an outer circumferential surface of said core;
   winding a coil on said core comprising the steps of:
      simultaneously winding a first plurality of coil portions on said core to form a first simultaneously-wound coil portion group;
      simultaneously winding a second plurality of coil portions on said core to form a second simultaneously-wound coil portion group, wherein said second plurality of coil portions of said second simultaneously-wound coil portion group are wound to be offset in the circumferential direction of said core from said first plurality of coil portions of said first simultaneously-wound coil portion group;
      wherein said first and second pluralities of coil portions are formed by lap winding wires a plurality of turns around a pair of said slots separated by a predetermined number of said slots, wherein said first and second simultaneously-wound coil portion groups are consecutively-wound groups, and wherein a number of vacant slots between adjacent ones of said coil portions within each of said simultaneously-wound coil portion groups is nonuniform;
   securing a commutator to said shaft, said commutator comprising a plurality of segments; and
   permanently electrically connecting pairs of said segments that should have the same electric potential with a plurality of equalizing connectors, so that each of pairs of said coil portions that should have the same electric potential has a substantially equal electrical potential,
   wherein each of said pairs of said segments is connected by a single equalizing connector of said plurality of equalizing connectors, and
   wherein each of said coil portions has a starting end connected to a first segment of said commutator and a finishing end connected to a second segment of said commutator, and said first segment is adjacent to said second segment.

* * * * *